Jan. 13, 1959

R. LOPEZ 2,868,098

CASING FOR CAMERA

Filed April 13, 1956

2 Sheets-Sheet 1

INVENTOR.

RENE LOPEZ

BY Zoltan P. Holecheck

ATTORNEY

Jan. 13, 1959 R. LOPEZ 2,868,098

CASING FOR CAMERA

Filed April 13, 1956 2 Sheets-Sheet 2

INVENTOR.
RENE LOPEZ
BY Zoltan Polachek
ATTORNEY

United States Patent Office 2,868,098
Patented Jan. 13, 1959

2,868,098

CASING FOR CAMERA

Rene Lopez, New York, N. Y.

Application April 13, 1956, Serial No. 578,041

2 Claims. (Cl. 95—11.5)

This invention concerns an articulated case or cabinet for a radio receiver and camera.

It is a principal object of the invention to provide a case including a reflex type of camera and a portable radio receiver.

It is a further object to provide an articulated case having a pair of hinged sections for a reflex camera and radio receiver respectively.

In the present invention the several sections can be pivoted to expose one side of the camera for loading film. In normal operation the camera and radio sections are juxtaposed so that pictures can be taken while the radio receiver is playing. The received broadcast program may serve to divert the attention of a person being photographed so that a more satisfactory picture can be taken. The case has a handle for convenience in carrying the combined camera and radio receiver.

The combined camera and radio receiver is a lightweight and compact device. The balance of radio and camera as combined in one case permits steadier holding thereby avoiding blurred and fuzzy pictures.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 3:
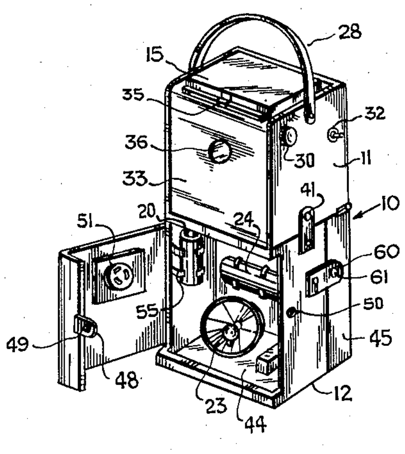
Fig. 3 is a reduced perspective view similar to Fig. 2 showing a storage compartment.
Figure 4:
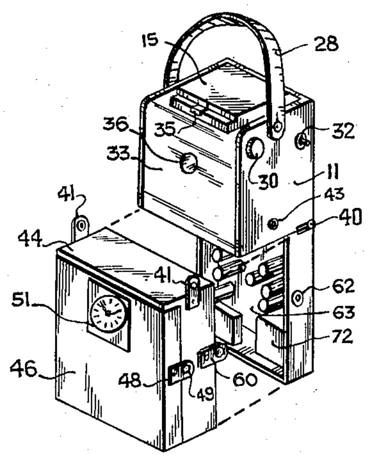
Fig. 4 is a reduced exploded perspective view similar to Fig. 2 showing the radio receiver chassis.
Figure 5:
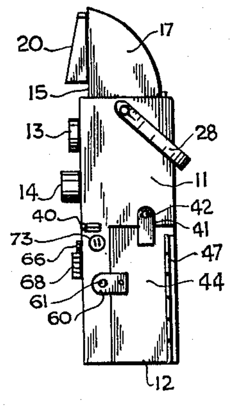
Fig. 5 is a side elevational view of the camera-radio receiver.
Figure 6:
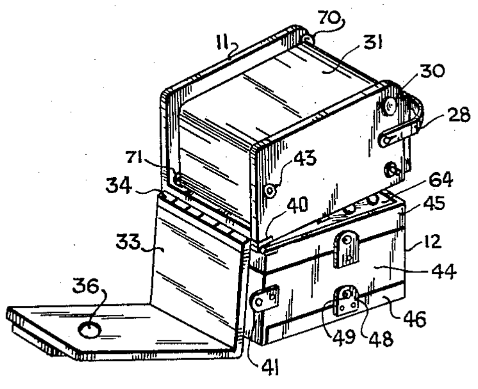
Fig. 6 is a perspective view of the camera-radio receiver with sections disposed to release the camera film cover.

In Figs. 1 to 6 is shown a casing 10 having a cubical upper section 11 and a cubical lower section 12. The upper section has lenses 13, 14 disposed at the front thereof as in a conventional reflex camera. At the top of the section is a lid 15 pivotable on hinge 16. A hood is formed by a pair of side plates 17 and lid 15 when the lid is raised as shown in Fig. 5. A bracket 18 is provided to secure telescope 20 to the upper section of the casing. A bracket 22 supports a reflector 23 to which is attached battery case 24. A flash bulb 25 is disposed in the reflector. The bracket 22 is supported to the side of the casing by one or more screws 27. A handle 28 has slotted ends engaged by buttons 29 attached to the sides of the casing. A knob 30 is provided for rolling film 31 inside of section 11. Push button 32 in the side of the casing operates the shutter of the camera and simultaneously actuates flash bulb 25 in conventional manner. The upper section 11 has a rear and bottom cover or wall 33 arranged as one integral member pivotable on a hinge 34 at the bottom of the section. A latch 35 on lid 15 holds the upper end of cover 33. A window 36 is provided in the cover 33 for observing the film during winding thereof.

The upper and lower sections are pivotally secured together by a hinge 40 at the front of the casing. A tab 41 carrying a fastener element 42 is attached to each side of section 12. A mating fastener element 43 is mounted on the side of section 11.

The lower section 12 has separate compartments 44 and 45. Compartment 44 is a storage box provided with a door 46 which serves also as the rear wall of section 12. The door 46 swings on a hinge 47 at one side of the compartment and is secured by a tab 48 and fastener 49 to a fastener 50 on the other side of the compartment. A clock 51 is mounted in the door 46. Inside the compartment 44 space is provided for storing reflector 23, telescope 20, battery case 24, extra rolls of film, and other camera accessories. Brackets 55 are provided on the walls of the compartment to hold various items in the storage space. A tab 60 having a fastener element 61 is secured to each side of compartment 44. A fastener element 62 on each side of compartment 45 engages and holds element 61, so that box 44 serves as a cover for compartment 45.

Compartment 45 is a rectangular box which contains a radio receiver chassis 63. All necessary circuit components, battery, etc., are contained within the compartment. At the front of the compartment is a panel 64 on which is mounted a tuning knob 68 and tuning dial 65. A combined volume control knob and on-off switch 66 is also mounted on the panel. Apertures 67 are provided in the panel behind which is a loud-speaker for the radio receiver. A grill may be substituted for the apertures 67.

Figure 1:
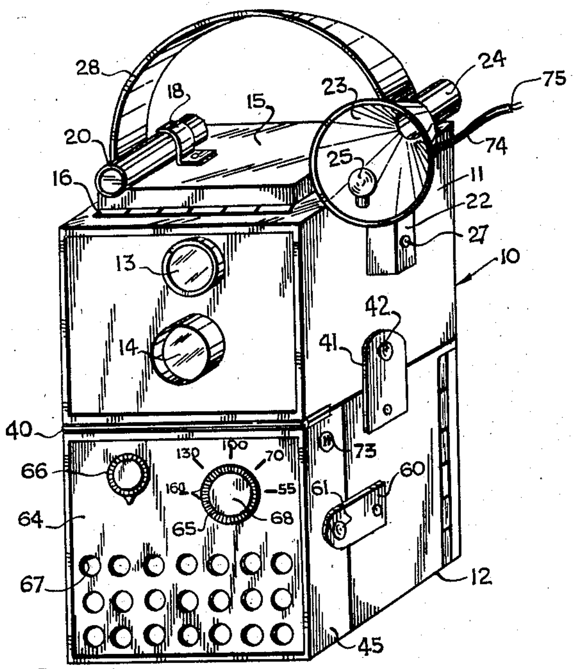
Fig. 1 is a perspective front and side view of the case containing the combined camera and radio receiver.
Figure 2:
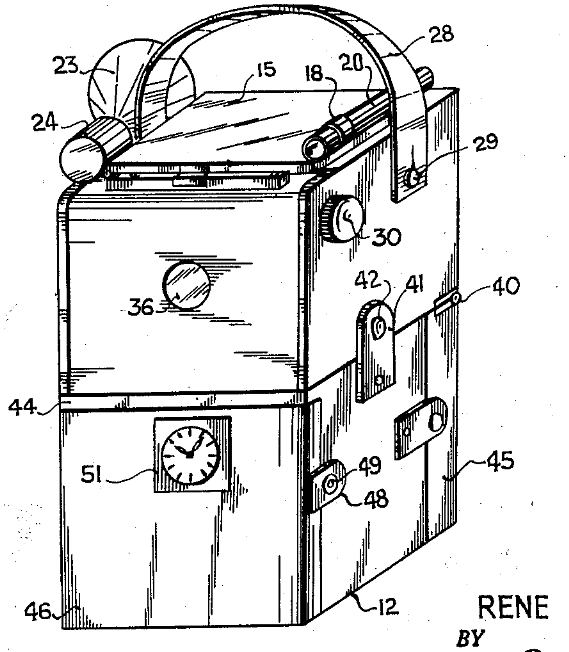
Fig. 2 is a perspective rear and side view of the combined camera-radio receiver.

Figs. 1 and 2 show the combined camera-radio receiver set up for taking photo-flash pictures. The radio receiver may be turned on to divert the attention of persons being photographed to obtain more natural and relaxed poses. If distant sighting is to be used, the telescope 20 is used. In Fig. 5 the lid 15 is raised so that reflex viewing of the subject to be photographed may be had. In Fig. 3 the door 46 is shown open so that access may be had to the storage space in compartment 44. This compartment may be wholly removed as shown in Fig. 4 by releasing tabs 41 and 60 so that the radio chassis 63 may be exposed at the rear compartment 45. To load film 31 in the upper section 11, tabs 41 are released and the sections are pivoted with respect to each other on hinge 40 to expose the bottom of section 11. Then catch 35 is released so that cover 33 may be opened. The film may then be loaded on or removed from rollers or spools 70, 71 as required.

When the casing is closed and assembled as shown in Figs. 1 and 2, handle 28 provides a convenient means for transporting the camera-radio receiver. The invention thus provides in one compact unit two valuable personal accessories which may be used together for entertainment and for obtaining more satisfactory photographs.

In order to render the unit more compact the battery 72 which is mounted or stored in the radio receiver compartment 45 may be connected by wires to a socket 73 mounted on a wall of compartment 45. The flash bulb holder 23 may then be provided wth a cable 74 terminating in a plug 75 for insertion in socket 73. By this means both the radio receiver and flash bulb may be energized by the same battery 72 stored in the radio receiver compartment.

The combined widths and depths of boxes 44 and 45 which comprise section 12 equal the width and depth respectively of section 11 as shown in Figs. 1, 2 and 12, so that the sections 11 and 12 form a compact rectangular body when closed in position for carrying by handle 28.

The device described herein provides in one compact, light weight, versatile unit a combined camera and radio receiver. The unit is so arranged and the weight and mass of the several parts are so distributed and balanced that the case can be held very steady to produce clearer pictures. The weight and mass of the radio and its location at the bottom of the units provides a convenient means for holding and aiming the camera as well as steadying it while pictures are being taken. If desired, the bottom of the lower section 12 can be provided with a threaded socket for mounting the casing on a screw topped tripod. The tripod may be of a conventional collapsible type and may be stored in compartment 44 when not in use. The provision of compartment 44 makes it unnecessary for the photographer to carry a separate "gadget" bag since all accessories may conveniently be stored in the compartment.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. In a device of the character described, a casing having a pair of hinged sections, one of said sections including a first rectangular box having an open side, a battery mounted in said box and connected to a socket on one wall of said box, another rectangular box removably secured to the open side of the first box and providing a cover therefor, the other of said sections containing a camera, a flash bulb holder mounted on one wall of said other section, electrical cable means separably connecting said flash bulb holder and socket to energize the flash bulb, said other box being further separably attached to said other section, the combined widths and depth of the first and second boxes of said one section being equal to the width and depth respectively of said other section, said sections forming a single rectangular body when the sections are closed, and a handle secured near the top of said other section for carrying the casing with the sections closed, said camera being set up for taking pictures by the light of said flash bulb when the sections are closed.

2. In a device of the character described, a casing having a pair of hinged sections, one of said sections including a first rectangular box having an open side, a battery mounted in said box and connected to a socket on one wall of said box, another rectangular box removably secured to the open side of the first box and providing a cover therefor, the other of said sections containing a reflex camera having a shutter, a flash bulb holder mounted on one wall of said other section, electrical cable means separably connecting said flash bulb holder and socket to energize the flash bulb, a push button carried by said other section for simultaneously actuating said shutter and flash bulb, said other box being further separably attached to said other section, the combined widths and depths of the first and second boxes of said one section being equal to the width and depth respectively of said other section, said sections forming a single rectangular body when the sections are closed, and a handle secured near the top of said other section for carrying the casing with the sections closed.

References Cited in the file of this patent

UNITED STATES PATENTS

| | | |
|---|---|---|
| 2,229,861 | McNabb | Jan. 28, 1941 |
| 2,290,307 | Wicker | July 21, 1942 |

OTHER REFERENCES

Washington Shopping News, November 9, 1948.